(12) United States Patent
Isoda et al.

(10) Patent No.: US 7,633,197 B2
(45) Date of Patent: Dec. 15, 2009

(54) DYNAMOELECTRIC MACHINE

(75) Inventors: Hitoshi Isoda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/553,178

(22) PCT Filed: Feb. 14, 2005

(86) PCT No.: PCT/JP2005/002168

§ 371 (c)(1),
(2), (4) Date: Aug. 22, 2007

(87) PCT Pub. No.: WO2005/078906

PCT Pub. Date: Aug. 25, 2005

(65) Prior Publication Data
US 2008/0150376 A1   Jun. 26, 2008

(30) Foreign Application Priority Data
Feb. 17, 2004   (JP) ............... 2004-040236

(51) Int. Cl.
*H02K 11/00* (2006.01)
(52) U.S. Cl. .............. 310/68 C; 310/89; 310/254
(58) Field of Classification Search .............. 310/68 C, 310/89, 179, 254, 71
See application file for complete search history.

(56) References Cited

U.S. PATENT DOCUMENTS

| | | | | |
|---|---|---|---|---|
| 4,395,746 A * | 7/1983 | Tanaka et al. ............... 361/143 |
| 4,827,487 A * | 5/1989 | Twerdochlib ............... 374/152 |
| 5,678,646 A * | 10/1997 | Fliege ............... 180/65.1 |
| 6,153,954 A * | 11/2000 | Uchida et al. ............... 310/68 C |
| 6,476,524 B1 * | 11/2002 | Miyamoto et al. ....... 310/12.19 |
| 6,541,888 B2 * | 4/2003 | van Heyden et al. ........ 310/214 |
| 6,707,182 B2 * | 3/2004 | Yamanaka et al. ........ 310/67 R |
| 6,774,504 B1 * | 8/2004 | Lagerwey ............... 290/44 |
| 7,161,259 B2 * | 1/2007 | Lagerwey ............... 290/44 |
| 2002/0117912 A1 * | 8/2002 | Kusase et al. ............. 310/68 C |
| 2003/0080644 A1 * | 5/2003 | Nelson et al. ............... 310/196 |
| 2005/0082940 A1 * | 4/2005 | Knauff et al. ............... 310/260 |

FOREIGN PATENT DOCUMENTS

JP    2003-23752 A    1/2003
JP    2003-92858 A    3/2003

* cited by examiner

*Primary Examiner*—Thanh Lam
(74) *Attorney, Agent, or Firm*—Sughrue Mion, PLLC

(57) ABSTRACT

A dynamoelectric machine enabling stator winding temperature detecting precision of a temperature measuring means to be improved while also improving assembly of the dynamoelectric machine is provided.

The dynamoelectric machine according to the present invention includes: a stator winding disposed in a stator; a temperature sensor for estimating a stator winding temperature of the stator winding; and a thermally-conductive bracket disposed between the stator winding and the temperature sensor. An estimated value of the stator winding temperature is calculated using a sum of a measured temperature measured by the temperature measuring means and a correcting value for correcting the measured temperature.

13 Claims, 7 Drawing Sheets

DYNAMOELECTRIC MACHINE

TECHNICAL FIELD

The present invention relates to a dynamoelectric machine in which stator winding temperature is estimated and detected.

BACKGROUND ART

In some conventional dynamoelectric machines, a guide for housing a temperature detecting element for detecting stator winding temperature is included, and the guide is held in direct contact with coil end portions of a winding. (See Patent Literature 1, for example.)

Patent Literature 1

Japanese Patent Laid-Open No. 2003-92858 (Gazette: pp. 2-5; FIG. 3)

However, a separate guide for housing the temperature detecting element is required in such dynamoelectric machines in order to hold the temperature detecting element on the coil end portions, and since such guides are fixed to a stator, one problem has been that the guides must have complicated shapes such as notched portions, hooked portions, etc., making assembly processes for such dynamoelectric machines complicated.

DISCLOSURE OF INVENTION

The present invention aims to solve the above problems and an object of the present invention is to provide a dynamoelectric machine enabling stator winding temperature detecting precision of a temperature measuring means to be improved while also improving assembly of the dynamoelectric machine.

In order to achieve the above object, according to one aspect of the present invention, there is provided a dynamoelectric machine including: a stator winding; a temperature measuring means disposed in a vicinity of the stator winding in order to estimate stator winding temperature; a thermally-conductive supporting portion for supporting the temperature measuring means; and a thermally-conductive body interposed between the stator winding and the supporting portion for conducting heat from the stator winding to the supporting portion, wherein: an estimated value of the stator winding temperature is calculated using a sum of a measured temperature measured by the temperature measuring means and a correcting value.

Using a dynamoelectric machine according to the present invention, assembly of the dynamoelectric machine is improved because it is not necessary to hold the temperature measuring means on the stator winding, and stator winding temperature detecting precision is improved because the stator winding temperature is estimated by calculating the sum of the measured temperature measured by the temperature measuring means and the correcting value for correcting the measured temperature.

BEST MODE FOR CARRYING OUT THE INVENTION

Preferred embodiments of the present invention will now be explained based on drawings, and identical or corresponding members and portions in the drawings will be given identical numbering.

Embodiment 1

Figure 1:
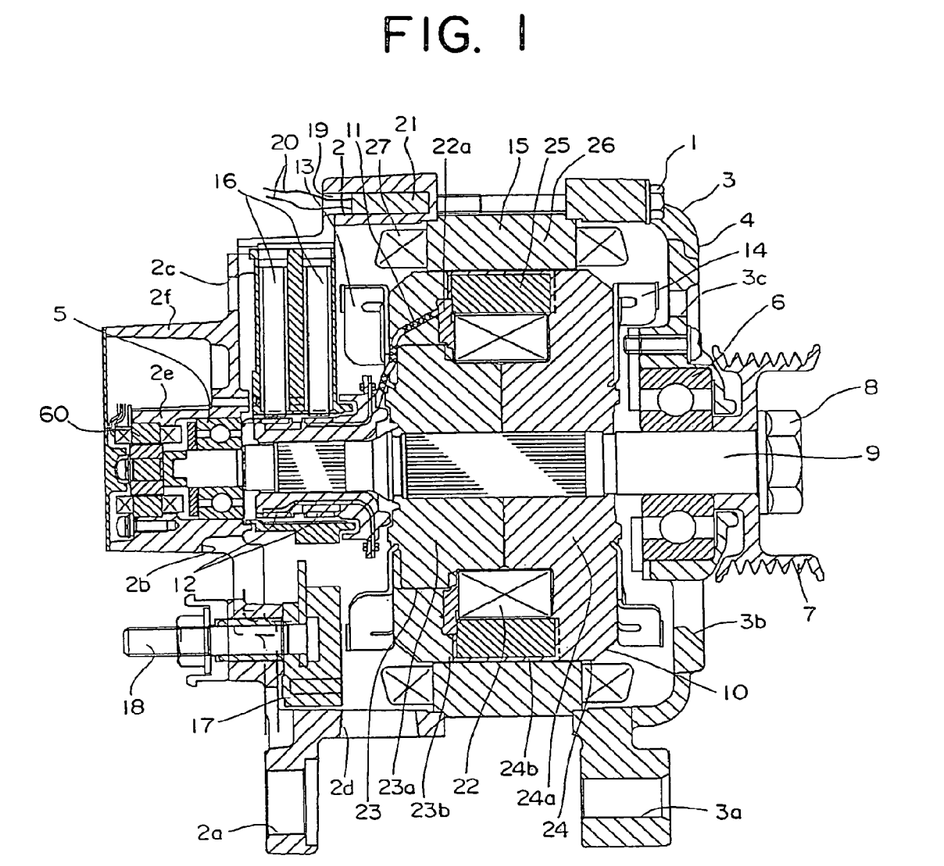
FIG. 1 is a cross section showing a configuration of an automotive dynamoelectric machine according to Embodiment 1 of the present invention.
Figure 2:
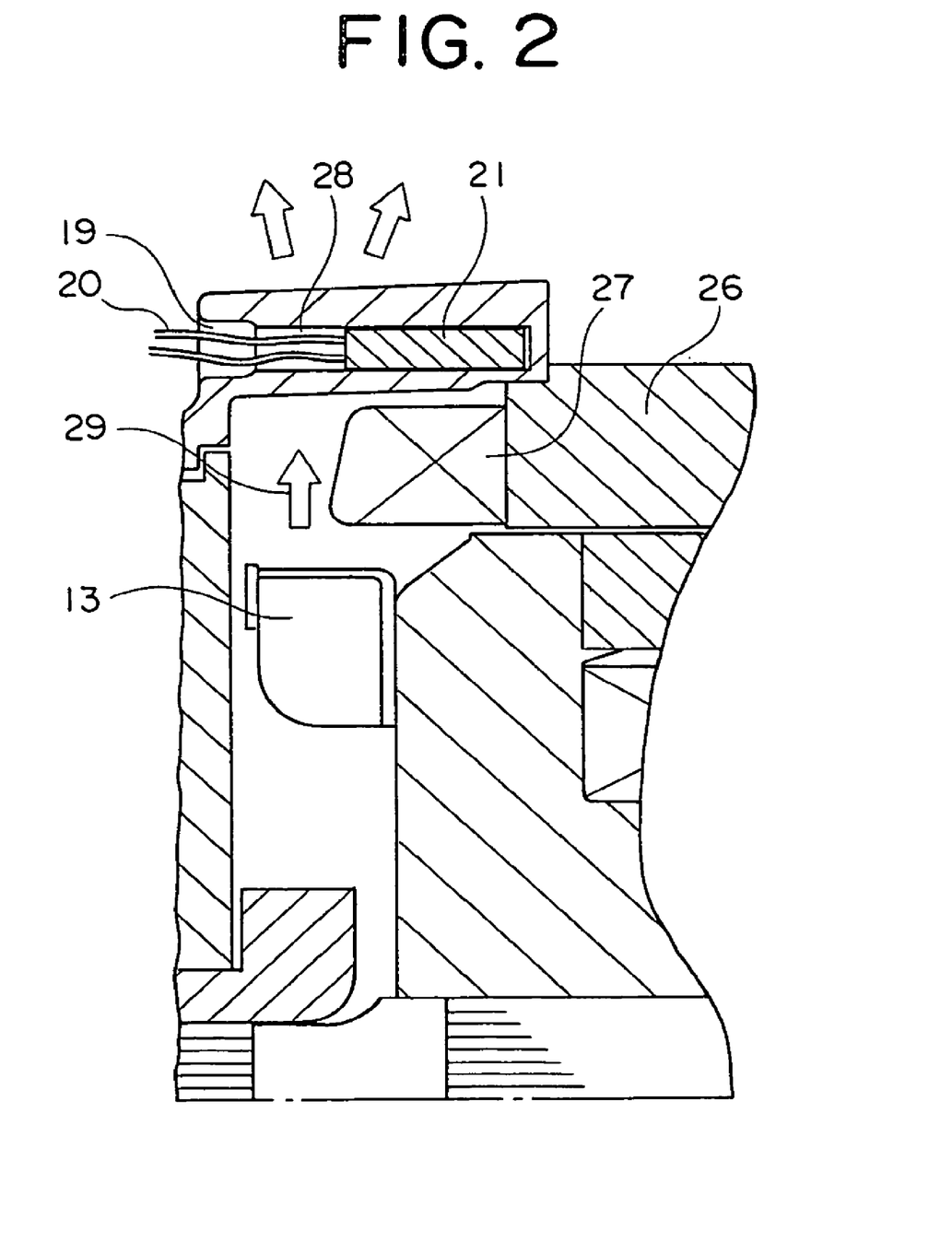
FIG. 2 is a cross section showing a vicinity of a temperature sensor mount portion of the automotive dynamoelectric machine in FIG. 1.

Embodiment 1 of the present invention will now be explained based on the drawings. FIG. 1 is a cross section showing a configuration of an automotive dynamoelectric machine according to Embodiment 1 of the present invention, and FIG. 2 is a cross section showing a temperature sensor mount portion and part of a vicinity of a stator from FIG. 1.

As shown in FIG. 1, an automotive dynamoelectric machine includes: a case 4 constituted by rear and front brackets 2 and 3 constituted by members that do not generate heat integrated by a bolt 1; a rotating shaft 9 supported inside the case 4 by means of bearings 5 and 6, a pulley 7 being fixed to a first end portion of the rotating shaft 9 by a nut 8; a rotor 10 fixed to the rotating shaft 9; slip rings 12 fixed to a second end portion of the rotating shaft 9, the slip rings 12 supplying an electric current to the rotor 10 by means of electric wires 11; cooling fans 13 and 14 fixed to first and second end surfaces of the rotor 10; a stator 15 fixed to the case 4; a pair of brushes 16 sliding on the slip rings 12; a terminal block 18 electrically connected to a circuit board 17 and to the stator 15 through electric wires (not shown); and a temperature sensor 21 constituting a temperature detecting means inserted into an aperture portion 19a formed on a supporting portion 19 of the rear bracket 2 and connected by means of temperature sensor output lead wires 20 to a connector (not shown) for external connection.

Vehicle body mounting apertures 2a and 3a and vents 2b, 2c, 2d, 3b, and 3c for internal cooling are formed on the brackets 2 and 3. A tubular hood portion 2f is disposed so as to protrude from the rear bracket 2 on an opposite side from the rotor 10, and a sensor mount portion 2e for a sensor 60 for detecting rotational position of the rotor 10 is formed inside the hood portion 2f.

The rotor 10 includes: a field winding 22 for generating magnetic flux on passage of an electric current; and a rotor core constituted by first and second pole core bodies 23 and 24 disposed so as to cover the field winding 22, magnetic poles being formed in the pole core bodies 23 and 24 by the magnetic flux from the field winding 22.

The rotor core has: first and second cylindrical portions 23a and 24a on which the field winding 22 is disposed by means of a bobbin 22a; and first and second claw-shaped magnetic pole portions 23b and 24b.

The first and second magnetic pole portions 23b and 24b are each formed so as to have a predetermined number of poles, and cross over alternately so as to cover a radially-outer side of the field winding 22. Adjacent first magnetic pole portions 23b and second magnetic pole portions 24b are arranged at a uniform pitch with a predetermined clearance interposed circumferentially, and are magnetized by the field winding 22 so as to have alternately opposite poles. Permanent magnets 25 are inserted into the clearance so as to reduce the magnetic leakage flux between the first magnetic pole portions 23b and the second magnetic pole portions 24b.

The stator 15 is constituted by: a stator core 26 through which a rotating magnetic field from the rotor 10 passes; and a stator winding 27 through which an output current flows, the stator winding 27 being configured by winding conducting wires onto the stator core 26.

As shown in FIG. 2, the temperature sensor 21 is inserted into the aperture portion 19a of the supporting portion 19 for the temperature sensor 21 disposed on the rear bracket 2, and is embedded in a member 28 made of a resin, etc. Thus, the temperature sensor 21 is installed in a vicinity of the stator 15. Moreover, a resin having a comparatively high thermal conductivity (such as a resin having a metal, etc., mixed in, for example) can be used for the resin.

The present invention has a thermally-conductive construction in which heat generated by the stator winding 27 is transferred from the stator winding 27 to the rear bracket 2 through the stator core 26, which constitutes a thermally-conductive body.

When the automotive dynamoelectric machine rotates, external air is sucked inside through the vents 2b, 2c, 3b, and 3c by the cooling fans 13 mounted to the rotor 10, giving rise to cooling airflows 29, and these cooling airflows 29 pass through the coil end portions of the stator winding 27 and the vicinity of the stator winding 27 and flow out through air outlets (not shown) disposed in the rear bracket 2. At the same time as the stator winding 27 and the stator core 26 are cooled by these cooling airflows 29, a vicinity of the rear bracket 2 where the temperature sensor 21 is mounted is also cooled. Thus, in this embodiment, air is a cooling medium.

Next, operation when an automotive dynamoelectric machine having the above configuration is used as a generator will be explained.

An electric current is supplied from a battery (not shown) through the brushes 16 and the slip rings 12 to the field winding 22, generating a magnetic flux, and magnetizing the first magnetic pole portions 23b of the rotor core into North-seeking (N) poles, and magnetizing the second magnetic pole portions 24b into South-seeking (S) poles.

At the same time, since the pulley 7 is driven by an engine and the rotor 19 is rotated by the rotating shaft 9, a rotating magnetic field is applied to the stator winding 27, giving rise to an electromotive force in the stator winding 27. This alternating electromotive force passes through a rectifier of an inverter (not shown) and is converted into direct current, the magnitude thereof is adjusted by the inverter (not shown), and the battery is recharged.

Next, operation when an automotive dynamoelectric machine having the above configuration is used as an electric motor will be explained.

During starting of the engine, an alternating current is supplied to the stator winding 27 by the inverter. A field current is also supplied through the brushes 16 and the slip rings 12 to the field winding 22, generating a magnetic flux and magnetizing the first magnetic pole portions 23b of the rotor core into North-seeking (N) poles and the second magnetic pole portions 24b into South-seeking (S) poles. The stator 15 and the rotor 10 act as electromagnets, and the rotor 10 rotates inside the stator 15 with the rotating shaft 9. Torque from the rotating shaft 9 is transmitted to an output shaft of the engine by means of the pulley 7, starting the engine.

As described above, the automotive dynamoelectric machine functions as a generator and a motor, and the temperature of the stator winding 27 increases in the generator and the motor states, but a difference arises between the temperature of the stator winding 27 and the temperature at the temperature sensor 21 since the temperature sensor 21 is not placed in contact with the stator winding 27.

Next, a method for calculating an estimated value of stator winding temperature for the automotive dynamoelectric machine shown in FIG. 1 will be explained.

Figure 3:
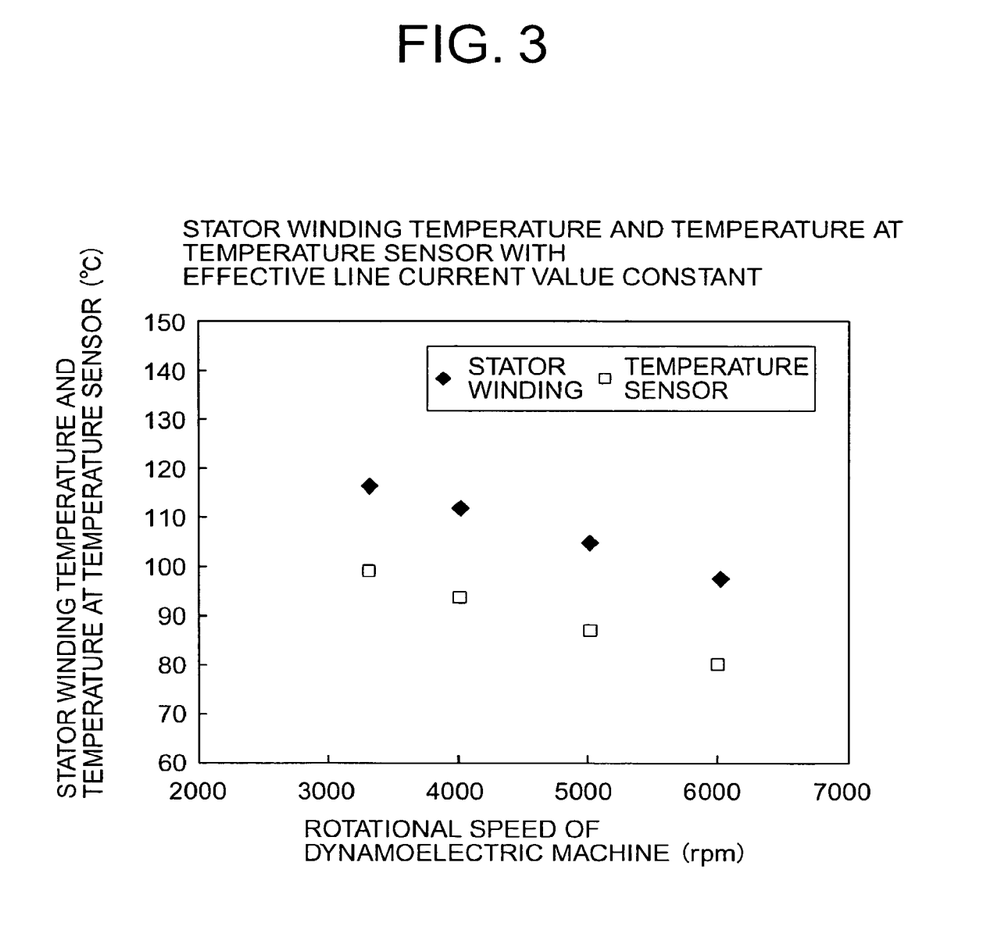
FIG. 3 is a graph showing relationships between rotational speed and stator winding temperature and between rotational speed and temperature sensor detected temperature in the automotive dynamoelectric machine in FIG. 1.
Figure 4:
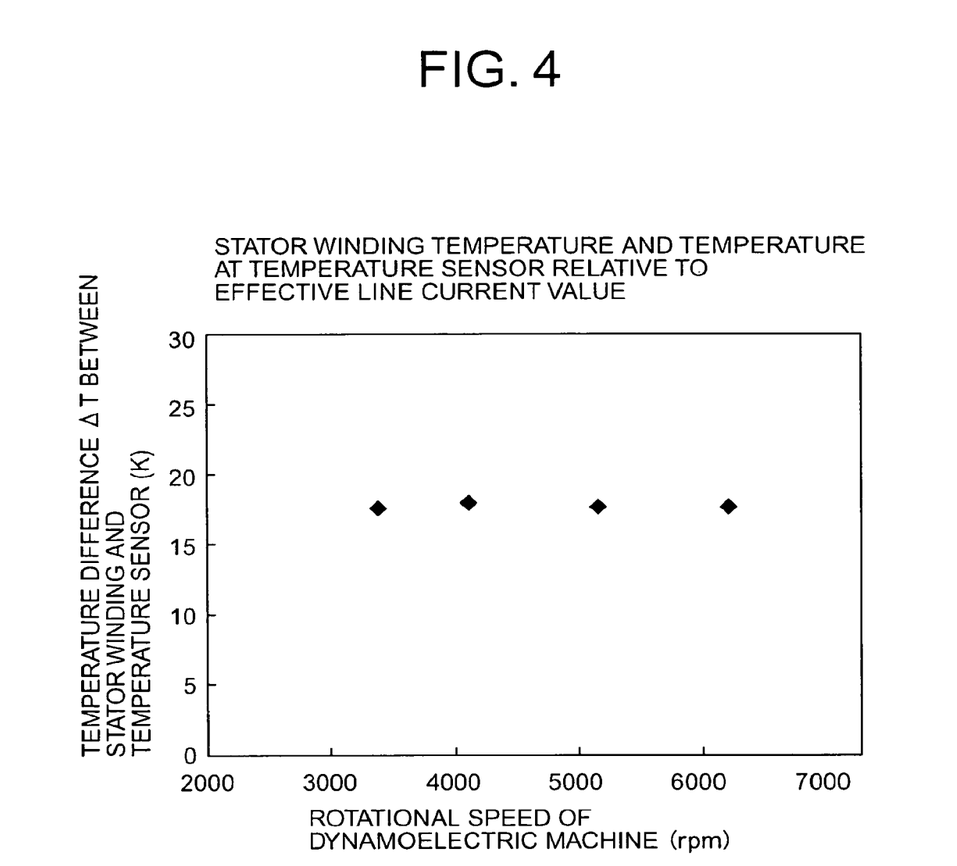
FIG. 4 is a graph showing a relationship between rotational speed and temperature difference between a stator winding and the temperature sensor in the automotive dynamoelectric machine in FIG. 1.

FIG. 3 is a graph showing relationships between stator winding temperature Ts and rotational speed of the dynamoelectric machine and between temperature Th at the temperature sensor 21 and rotational speed of the dynamoelectric machine for the automotive dynamoelectric machine shown in FIG. 1. FIG. 4 is a graph showing a relationship between a temperature difference $\Delta T$ between the stator winding temperature Ts and the temperature Th at the temperature sensor 21 and rotational speed of the dynamoelectric machine.

Moreover, FIGS. 3 and 4 were prepared based on data found empirically by the present inventors, and the stator winding temperature Ts and the temperature Th at the temperature sensor 21 were measured when the stator winding temperature became saturated with the line current constant.

As can be confirmed from FIGS. 3 and 4, if the line current is constant, the stator winding temperature Ts and the temperature Th of the temperature sensor 21 at temperature saturation may change, but the temperature difference $\Delta T$ generally progresses without changing even if the rotational speed varies.

This is considered to be because the rear bracket 2 itself is not a heat source and has a thermally-conductive construction in which heat is conducted from the stator winding 27 to the supporting portion 19 to which the temperature sensor is mounted, and because temperature changes in the stator winding 27 and temperature changes at the temperature sensor 21 progress similarly and the temperature Th at the temperature sensor 21 is lower than the stator winding temperature Ts in any given state since members constituting the stator 10 and the rear bracket 2 in the vicinity of the temperature sensor 21 are cooled by an identical cooling airflow.

Now, $Tsa=Th+\Delta T$, and if we let $\Delta T=\alpha$, where $\alpha$ is a constant, the stator winding temperature estimated value Tsa can be calculated from the temperature Th at the temperature sensor 21 using a specific constant value $\alpha$ as a correcting value for the temperature difference $\Delta T$ of the stator winding temperature Ts and the temperature Th at the temperature sensor 21.

Here, a maximum value of line current at a continuous rating of an automotive dynamoelectric machine is limited by electromagnetic specifications, line current capacities of direct-current and alternating-current bidirectional power conversion equipment, etc.

Consequently, a temperature difference $\Delta T(max)$ between a stator winding temperature Ts(max) and a temperature Th(max) at the temperature sensor 21 is measured when the stator winding temperature is saturated at a maximum value Iac(max) of the line current at the continuous rating, and the temperature Tsa of the stator winding 27 is estimated from the temperature Th at the temperature sensor 21 using Tsa=Th+ΔT(max).

Next, examples of operation of an automotive dynamoelectric machine having the above configuration using estimated stator winding temperature estimated values Tsa will be explained.

As a first example, estimated stator winding temperature estimated values Tsa can be used as determining references for overheating protection in the stator winding 27.

In an automotive dynamoelectric machine, if the estimated stator winding temperature estimated value Tsa is greater than or equal to a predetermined temperature (a temperature set so as to protect the stator winding 27 against overheating, for example), the electric current flowing through the stator winding 27 is suppressed so as to reduce heat generated in the stator winding 27 in order to protect against overheating.

As a second example, stator winding temperature estimated values Tsa can be used as determining references for stopping an engine.

When the automotive dynamoelectric machine is used as an electric motor for driving an engine (not shown) connected to the rotor 10, the engine can be stopped if the stator winding temperature estimated value Tsa is less than or equal to a predetermined value when a vehicle is stopped.

Here, when the stator winding temperature estimated value Tsa is less than or equal to the predetermined value, resistance in the stator winding 27 becomes less than or equal to a predetermined value, and voltages arising between three phase terminals of the automotive dynamoelectric machine are set lower in order to facilitate control of the automotive dynamoelectric machine when the engine is restarted.

As explained above, using an automotive dynamoelectric machine according Embodiment 1, one effect is that the stator winding temperature Ts can be estimated accurately from the temperature at the temperature sensor 21.

Since there is no heat source in the vicinity of the temperature measuring means, the stator winding temperature Ts can be estimated more accurately from the temperature at the temperature sensor 21.

Since cooling is performed by an identical cooling medium, temperature changes in the stator winding 27 and at the temperature sensor 21 progress similarly, enabling the stator winding temperature Ts to be estimated more accurately from the temperature at the temperature sensor 21.

Since the supporting portion 19 and the stator 10 are separate members, assembly is good because assembly processes for each are independent, and the temperature sensor 21 can be mounted in a final process.

By using the estimated stator winding temperature estimated value Tsa as a determining reference for overheating protection, overheating protection of the automotive dynamoelectric machine can be performed accurately.

By using the estimated stator winding temperature estimated value Tsa as a determining reference for stopping an engine, the engine can be stopped accurately when the vehicle is stopped.

Because the temperature sensor 21 is simply inserted into the aperture portion 19a of the rear bracket 2 and embedded in a resin, a member for mounting and fixing the temperature sensor 21 so as to be placed in contact with the stator winding 27, etc., is no longer necessary, enabling machinability to be improved.

Moreover, if a specific temperature detecting precision is necessary when the temperature of the stator winding 27 is at a predetermined value, the temperature at that predetermined value can be measured accurately if a temperature difference ΔTx between the stator winding temperature and the temperature at the temperature sensor 21 is measured in advance under those conditions, and absolute terms of the above expression are set in advance.

Embodiment 2

Configuration and operation of an automotive dynamoelectric machine according to Embodiment 2 of the present invention are similar to those of Embodiment 1, but a method for calculating a temperature difference ΔT between a stator winding temperature Ts and a temperature Th at a temperature sensor 21 is different.

Here, since an amount of heat Qa generated by a single phase portion of a stator winding is given by $Qa=R \times Iac^2$, where R is resistance in the single phase portion of the stator winding, then temperature difference ΔT is determined by a second-order function of line current flowing into the stator winding 27, which is a major reason for temperature increases in the stator winding 27.

Specifically, Tsa=Th+ΔT, and if we let $\Delta T = \alpha \times Iac^2$, where α is a constant, the stator winding temperature estimated value Tsa can be calculated from the temperature Th at the temperature sensor 21 using a second-order function of the effective line current value Iac for the temperature difference ΔT.

Figure 5:
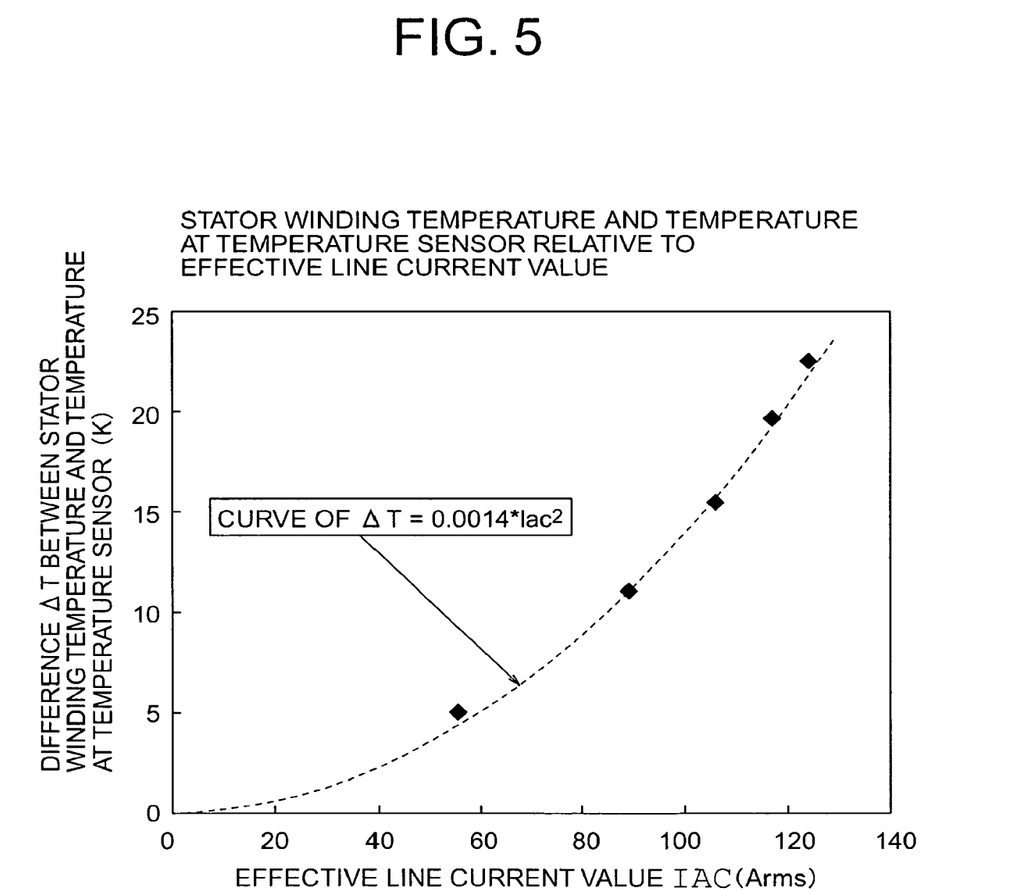
FIG. 5 is a graph showing difference between stator winding temperature and temperature sensor detected temperature over effective line current value in an automotive dynamoelectric machine according to Embodiment 2 of the present invention.

FIG. 5 is a graph showing difference between stator winding temperature and temperature sensor detected temperature over effective line current value in an automotive dynamoelectric machine according to Embodiment 2 of the present invention.

As shown in FIG. 5, the temperature difference between the stator winding temperature and the temperature at the temperature sensor 21 increases as the line current flowing through the stator winding 27 increases.

Now, a second-order curve of $\Delta T = \alpha \times Iac^2$ with α set to 0.0014 is shown in FIG. 5, and it can be confirmed that this second-order curve represents generally equivalent values of temperature difference between the stator winding temperature Ts and the temperature Th at the temperature sensor 21 to those obtained from experiments.

Thus, it can be confirmed that the temperature of the stator winding 27 can be estimated accurately by setting Tsa=Th+ΔT, and $\Delta T = \alpha \times Iac^2$.

As explained above, using an automotive dynamoelectric machine according Embodiment 2 of the present invention, the stator winding temperature Ts can be estimated accurately from the temperature at the temperature sensor 21, even if the value of the line current changes, by making the temperature difference between the stator winding 27 and a temperature of a detecting portion a function corresponding to heat generated in the stator winding 27, which constitutes a reason for temperature increases in the stator winding 27.

Moreover, Iac represents line current, but other values used for line current can also be applied by modifying the set value of the coefficient α if other physical quantities, etc., capable of representing the line current of the three phase wires of the automotive dynamoelectric machine (such as effective line current values read by a current sensor (not shown), effective line current values after passing through a filter circuit (not shown), sum of squares of a two-phase electric current value after conversion from three-phase to two-phase, etc.) are used.

If there is still a difference between the temperature of the stator winding 27 and the value estimated by the temperature sensor 21, then $\Delta T = \alpha \times Iac^2 + \beta \times Iac + \gamma$ may also be used, where $\beta$ and $\gamma$ are constants.

Embodiment 3

Configuration and operation of an automotive dynamoelectric machine according to Embodiment 3 of the present invention are similar to those of Embodiments 1 and 2, but the stator winding temperature estimated value Tsa is corrected by being averaged over time.

Specifically, $Tsb = ((Tsa) + K)/(N+1)$, $Tsa = Th + \Delta T$, and if we let $\Delta T = \alpha \times Iac^2$, where $\alpha$ is a constant, a corrected stator winding temperature estimated value Tsb can be calculated by calculating and correcting a stator winding temperature estimated value Tsa from the temperature Th at the temperature sensor 21.

Here, the temperature difference $\Delta T$ is a second-order function of the line current Iac, K is a sum of Tsa for the preceding X seconds, and N is the number of stator winding temperature estimated values estimated by the temperature sensor 21 for the preceding X seconds (i.e., the number of the temperature measurement values at the temperature sensor 21 for the preceding X seconds).

Figure 6:
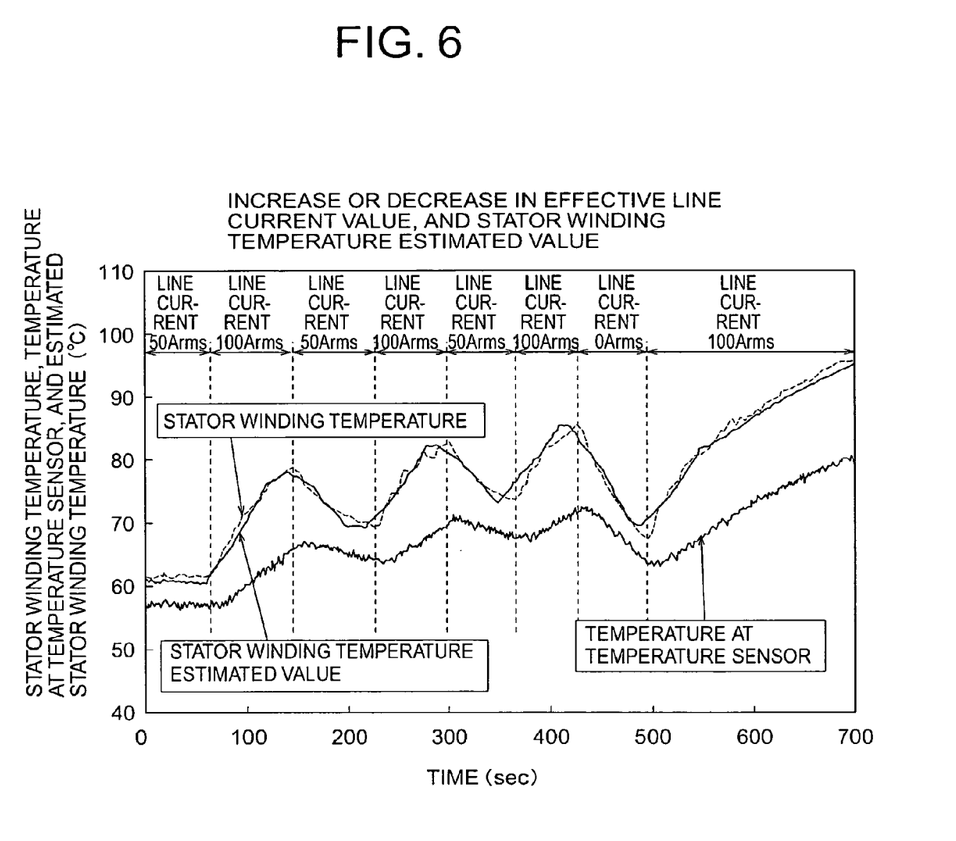
FIG. 6 is a graph showing stator winding temperature, temperature sensor detected temperature, and stator winding temperature estimated by a temperature sensor over change in line current in an automotive dynamoelectric machine according to Embodiment 3 of the present invention.

FIG. 6 is a graph showing stator winding temperature, temperature sensor detected temperature, and stator winding temperature estimated by a temperature sensor over change in line current in an automotive dynamoelectric machine according to Embodiment 3 of the present invention.

FIG. 6 shows the stator winding temperature Ts, the temperature Th at the temperature sensor 21, and the corrected stator winding temperature estimated value Tsb where $\alpha = 0.0014$ and $X = 60$ seconds in the above expressions, when the line current Iac of an automotive dynamoelectric machine was varied interchangeably among 0 Arms, 50 Arms, and 100 Arms over constant time intervals.

As shown in FIG. 6, when the line current changes so as to increase, the temperature difference between the stator winding temperature Ts and the temperature Th at the temperature sensor 21 increases until the stator winding temperature is saturated, and when the line current changes so as to decrease, the difference between the stator winding temperature Ts and the temperature Th at the temperature sensor 21 decreases until the stator winding temperature is saturated.

In answer to this, the corrected stator winding temperature estimated value Tsb corrected by setting the values of $\alpha$ and X (i.e., K and N) as described above, taking estimates from the temperature Th at the temperature sensor 21, and averaging over time generally follows the measured value of the stator winding temperature Ts.

As explained above, using an automotive dynamoelectric machine according Embodiment 3 of the present invention, the stator winding temperature Ts can be estimated accurately from the temperature at the temperature sensor 21 even if the value of the line current flowing through the stator winding 27 is in a transient state and changes arbitrarily.

Moreover, in each of the above embodiments, data from a specific automotive dynamoelectric machine has been studied, but the present invention can also be similarly applied to automotive dynamoelectric machine having different structural or winding specifications by modifying the set value of each of the coefficients.

Embodiment 4

Figure 7:
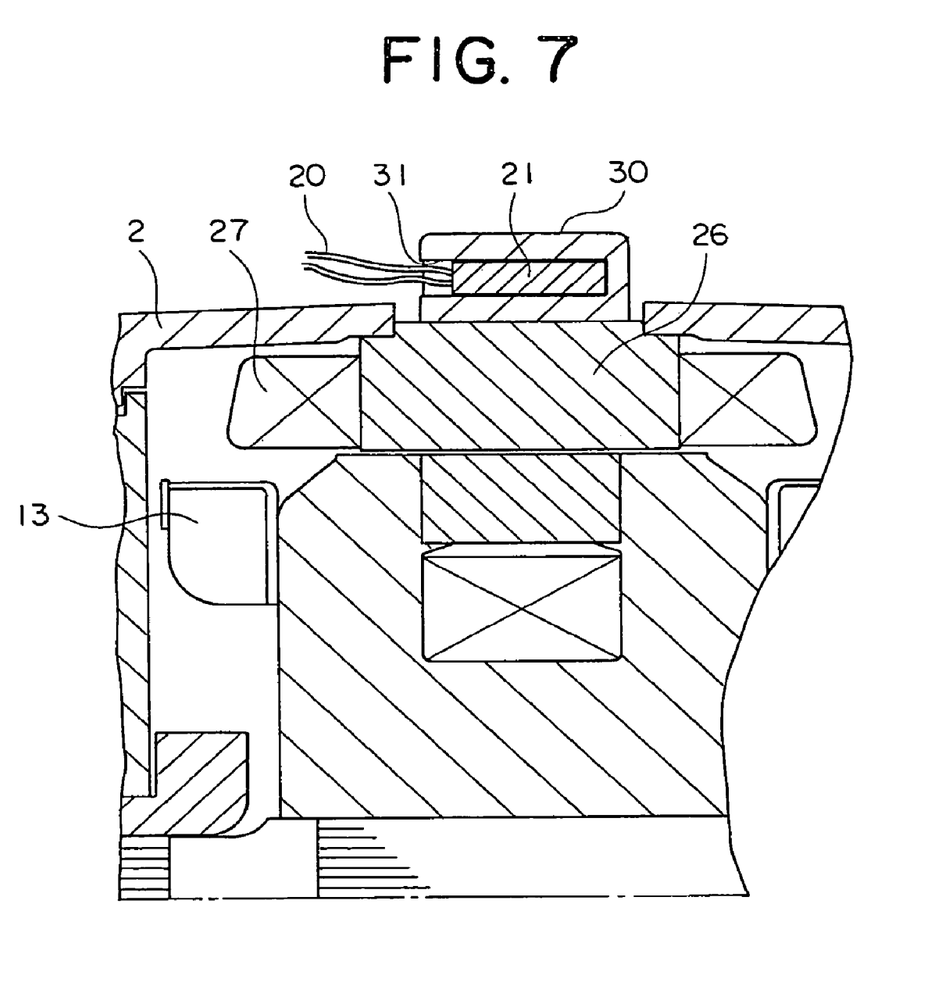
FIG. 7 is a cross section showing a vicinity of a temperature sensor mount portion of an automotive dynamoelectric machine according to Embodiment 4 of the present invention.

FIG. 7 is a cross section showing a configuration of part of an automotive dynamoelectric machine according to Embodiment 4 of the present invention. In FIG. 7, a dynamoelectric machine differs from the dynamoelectric machine according to Embodiment 1 by including a supporting portion 30 constituted by a member that does not generate heat joined to a stator core 26. A temperature sensor 21 is inserted into an aperture portion 30a formed in the supporting portion 30, and is embedded in a member 28 made of a resin, etc.

The supporting portion 30 is constituted by a member made of a material having comparatively good thermal conductivity such as iron, etc. Thermal conductivity at an interface between an outer peripheral surface of the stator core 26 and the supporting portion 30 is improved by applying a material such as a resin, an adhesive, or a varnish, etc., in gaps and joining the stator core 26 and the supporting portion 30 together by welding such that layers of air do not form.

As explained above, using an automotive dynamoelectric machine according Embodiment 4 of the present invention, it is not necessary for special machining or processes to be applied when manufacturing the stator 15 since the stator 15 and the supporting portion 30 are constituted by separate members, making machinability good.

The temperature of the stator winding 27 can be estimated accurately by modifying coefficients and set values in a temperature estimation method in a similar manner to Embodiments 1 through 3 explained above, and can be used as a determining reference for temperature protection of the automotive dynamoelectric machine and engine stopping when a vehicle is stopped.

Moreover, in each of the above embodiments, a dynamoelectric machine used in an automotive vehicle has been explained, but the dynamoelectric machine may also be used in outboard motors, etc.

The invention claimed is:

1. A dynamoelectric machine comprising:
    a stator winding;
    a temperature measuring means disposed in a vicinity of said stator winding in order to estimate stator winding temperature;
    a thermally-conductive supporting portion for supporting said temperature measuring means; and
    a thermally-conductive body interposed between said stator winding and said supporting portion for conducting heat from said stator winding to said supporting portion,
    wherein:
    an estimated value of said stator winding temperature is calculated using a sum of a measured temperature measured by said temperature measuring means and a correcting value.

2. The dynamoelectric machine according to claim 1, wherein:
    said supporting portion is constituted by a member that does not generate heat.

3. The dynamoelectric machine according to claim 1, wherein:
    said stator winding and said supporting portion are simultaneously cooled by an identical cooling medium.

4. The dynamoelectric machine according to claim 1, wherein:
    said supporting portion is a separate member from a stator holding said stator winding.

5. The dynamoelectric machine according to claim 1, wherein:
    said correcting value is determined using a function of a physical quantity based on a value of line current flowing through said stator winding.

6. The dynamoelectric machine according to claim 5, wherein:
said correcting value is determined using a second-order function of said value of said line current.

7. The dynamoelectric machine according to claim 1, wherein:
said estimated value is corrected by averaging over time.

8. The dynamoelectric machine according to claim 1, wherein:
said temperature measuring means is a temperature sensor.

9. The dynamoelectric machine according to claim 1, wherein:
an electric current flowing through said stator winding is suppressed if said estimated value is greater than or equal to a predetermined value.

10. The dynamoelectric machine according to claim 1, wherein:
an engine driven to rotate by said dynamoelectric machine is stopped if said estimated value is less than or equal to a predetermined value when a vehicle is stopped.

11. The dynamoelectric machine according to claim 1, wherein:
said supporting portion is disposed on a bracket for supporting a stator having said stator winding.

12. The dynamoelectric machine according to claim 1, wherein:
said supporting portion is disposed on an outer peripheral surface of a stator core to which said stator winding is mounted.

13. The dynamoelectric machine according to claim 1, wherein:
said thermally-conductive body is a stator core in which said stator winding is disposed.

* * * * *